March 6, 1945.    M. S. UNTERMAN    2,371,004
AIRCRAFT ARMAMENT
Filed Oct. 5, 1940

MANUEL S. UNTERMA,
INVENTOR

BY
Robert C Rasche
ATTORNEY

Patented Mar. 6, 1945

2,371,004

UNITED STATES PATENT OFFICE 2,371,004

AIRCRAFT ARMAMENT

Manuel S. Unterman, Far Rockaway, N. Y., assignor to Republic Aviation Corporation, a corporation of Delaware Application October 5, 1940, Serial No. 359,894

9 Claims. (Cl. 89—37.5)

This invention relates to aircraft armament, having reference more particularly to gun mounts for airplanes.

One of the objects of the invention is to provide an adjustable gun mount particularly adapted for support of a gun in a relatively thin airplane wing without the usual projection of mounting elements outside the wing contour.

Another object is to provide a simple and rugged gun mount having provision for elevational or vertical adjustment, the gun mount being of a minimum vertical dimension to accommodate the gun and its mount for housing entirely in the close interior of a relatively thin airplane wing.

A further object is to provide a gun mount having an improved releasable locking device to facilitate removal of the gun from the airplane, the device being effective to hold the gun with a wedging action securely against vibration and yet affording quick release.

Another object resides in the provision of a gun mount having a rotatable member for vertical gun adjustments and a lock device for releasing the gun, the latter functioning also to securely lock the adjustment member against unintended rotation in either direction.

Other objects and advantages will hereinafter appear.

In the drawing—

Figure 1:
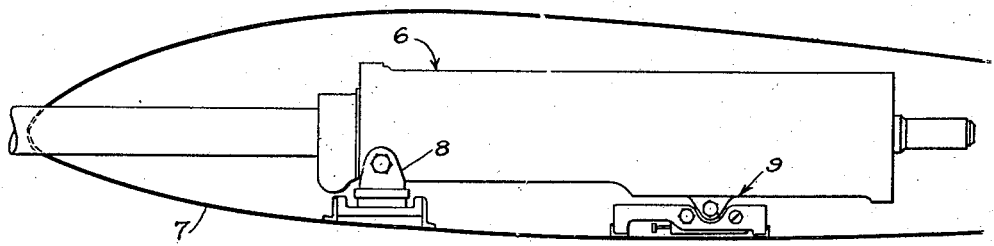
Figure 1 is a view in cross-section of an airplane wing showing a typical arrangement of the gun, including the gun mount of the invention.
Figures 2, 5:
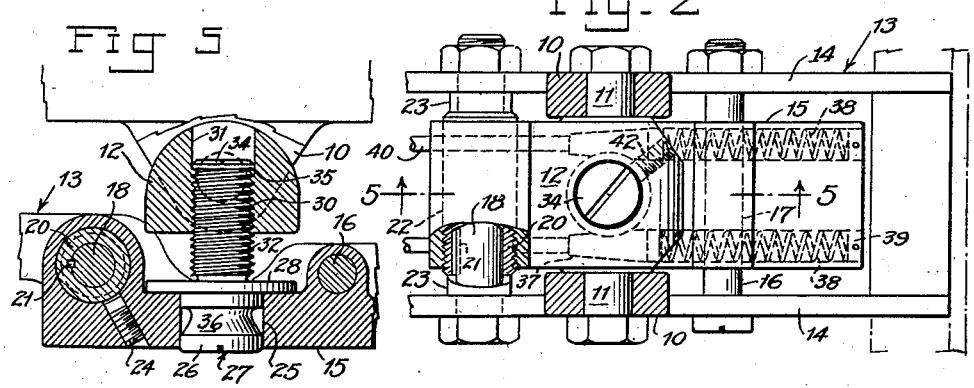
Figure 2 is a fragmentary plan view of the gun mount as viewed from a point just below the gun.
Figure 5 is a longitudinal section taken on the center line 5—5 of Figure 2, and showing the mount adjusted to maximum elevation.
Figure 3:
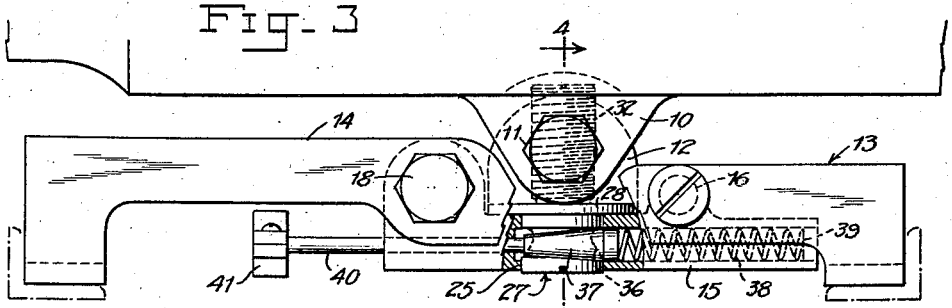
Figure 3 is a side elevational view partly in section of the gun mount.
Figure 4:
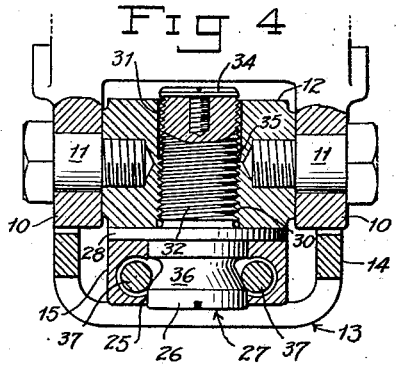
Figure 4 is an enlarged transverse section taken on line 4—4 of Figure 3.

As illustrated in Figure 1, the typical arrangement of the gun 6 in an airplane wing 7 usually provides a two-point mounting for the gun including a front mount 8 and a rear mount 9. The front mount 8 is usually a universal mount, accommodating pivotal movement of the gun in both a horizontal and a vertical direction. In adjustment of the gun's position with reference to the fore and aft axis of the plane to attain the desired alignment of the gun, it is the usual practice to make adjustment at the rear mount 9 which has provision for both vertical and lateral adjustment. To facilitate removal of the gun, the two mounts 8 and 9 usually each have releasable lock devices, operation of which affords instant separation of certain elements of each mount, which elements are interlocked when the gun is in place in the wing. The present invention is directed to provide certain improvements in the rear mount 9, illustrated in detail in Figures 2 to 5 inclusive.

The gun 6 is secured to the mount 9 by a pair of bearing lugs 10 extending downwardly in which trunnions 11 are journalled, the latter being threadedly secured in a block 12 arranged between the gun lugs 10. The mount 9 includes a base 13 affixed by suitable means to the wing structure and presenting a frame open at the bottom and having longitudinal side members 14 on which a laterally adjustable carriage 15 is slidably supported. The carriage 15 is mounted for lateral movement on the base frame 13 by a slide rod 16 fixed at each end in the frame members 14 and engaged in a transversal bore 17 in the carriage. The carriage 15 is further supported by a rotatable shaft 18 journalled in the frame side members 14 and having an externally threaded sleeve 20 fixed thereon by suitable means such as a key 21, the sleeve 20 engaging internal threads in a transversal bore 22 of the carriage 15. Spacer collars 23 are provided between each of the sleeve ends and the adjacent frame member 14. Rotation of the shaft 18 turns the threaded sleeve 20 and thus imparts a lateral movement to the carriage to adjust the gun 6 in a horizontal direction, which adjustment is secured by suitable means such as a set screw 24 arranged in the carriage 15 to engage the sleeve.

The carriage 15 has a vertical aperture or socket 25 in which the lower end member or journal 26 of an adjustment post 27 is journalled, the latter having a radially enlarged portion 28 forming an annular thrust shoulder seating on the upper face of the carriage 15. The post 27 extends upwardly into the aforesaid block 12 which has a central, vertical bore 30 threaded at its lower portion, the upper portion providing a counter-bore 31. The post 27 has a threaded section 32 engaging the threads of said bore and having a length approximating the depth of the block 12. The post 27 has secured to its upper end face a disk 34 forming a stop adapted to engage an annular shoulder 35 of the block when the mount is adjusted to maximum elevation, see Figure 5.

A locking device is provided which cooperates with the post 27 to releasably hold the gun 6 on the mount base. The lower end member or journal 26 of the post has a circumferential groove tapered to form a conical section 36. A tapered locking member or bolt 37, also of conical form, is disposed tangentially of the post end member or journal 26 and is arranged to slide axially in a bore of the carriage 15. A spring 38 within said bore is backed by a plug 39 in the bore end and presses the bolt 37 to bring its conical periphery into a wedging engagement with the conical section 36. Co-action of the bolt 37 with the post 27 is such as to wedge the post downwardly and thus hold the thrust shoulder 28 of the post firmly against the face of the carriage 15. Two locking bolts 37 are preferably provided to engage diametrically opposite portions of the conical groove 36. Each bolt 37 is provided with a push rod 40 projecting through a reduced bore in the carriage 15. To the free end of each push rod is secured a yoke or handle 41 by which both bolts 37 may be simultaneously operated. Manual pressure on the handle 41 slides the bolts 37 against the pressure of the springs 38 until the conical section of the bolt is entirely out of the aperture 25, thereby freeing the post 27 for axial withdrawal from said aperture in removing the gun from its mount. To replace the gun, the handle 41 is again operated to retract the bolts 37 and, after inserting the post 27 in the aperture 25, release of the handle permits the bolts to be brought into locking engagement with the conical section 36 in a wedging action to pull the post firmly into place.

By rotatably mounting or journaling the lower end member or journal 26 in the socket of carriage 15, the post 27 may be rotated so that the threaded cooperation between the member 12 and the post will produce a vertical adjustment of the rear end of the gun without removing any parts or destroying the total assembly. In the event the cooperation between the tapered groove 36 and the pins 37 is such that this rotation is hampered or retarded the pins 37 can be moved slightly against the action of the springs 38 to reduce the pressure, which will permit the rotation of the post 37 without its being disengaged, and after the proper or desired adjustment has been made by the rotation of the head 26 and post 27 the pins 37 may be allowed to return to their normal operative positions locking the head against axial or rotary movement.

It will also be noted that the wedging action of the bolts 37 produces a locking effect on the post 27 to prevent rotation of the latter in either direction, in that a tendency to rotate the post in one direction or the other causes an increase of the wedging action. A set screw 42 threaded in the block 12 and engaging the post 27 may be provided to maintain the elevational adjustment of the mount when the latter is removed from the carriage 15.

It will be seen from the foregoing that the invention provides a simple and rugged gun mount, the vertical dimension of which is minimized by the organization of the carriage 15, the post 27 and the block 12 together with the locking device embodied in the bolts 37. The gun mount, because of its minimum vertical size, is particularly suited for the support of a gun in a relatively thin airplane wing. The organization of the mount elements affords adequate elevational adjustment for the gun, as well as lateral adjustment, and also provides a dependable locking device to firmly hold the separable parts of the mount in normal association, while affording convenient and instant removal of the gun.

Having now made certain the nature and purposes of my invention, and at least one mode of executing same, in such manner as to enable anyone skilled in the art to which it apertains, to make and use same, as required by the statutes, that which I claim as my property, and desire to secure by Letters Patent of the United States, is:

1. An elevational adjustment device for an aircraft gun, comprising a support attachable to the aircraft and having a socket, a block attachable to the gun and having a through vertical bore including a threaded lower portion and a counterbored upper portion with an annular shoulder therebetween, and a post journalled at its lower end in the support socket and normally projecting through the block bore, said post having a threaded section engaging the threaded portion of said block and including a stop member at its upper end engageable with the annular shoulder of said block in the full elevated adjustment of the device.

2. In a separable gun mount a member having a socket, a gun post removably seated in said socket, and releasable locking means to hold said gun post within the socket, comprising a pair of spring-pressed lock bolts slidable in said member and disposed tangentially of said post, said lock bolts and said post each having surfaces inclined from the respective longitudinal axes thereof, said surfaces coacting to create a constant seating thrust of the post in said socket.

3. In a separable gun mount including a mounting member having a socket and a gun post seatable in said socket, releasable locking means comprising a pair of conical members slidable in said mounting member and disposed tangentially of said post in a plane transverse to the axis thereof, said post having a conical portion engageable by said conical members to press down said post securely on said mounting member.

4. A separable mount for an aircraft gun adapted for elevational gun adjustment comprising a support attachable to the aircraft and having a socket, a normally fixed member on the gun having a threaded bore, a threaded post seated in said support socket and adapted for axial withdrawal therefrom, said post extending into the threaded bore of said member, whereby the threads of the post and bore cooperate to effect an elevational gun adjustment upon the rotation of the post in said socket, and means for releasably holding said post against rotation within the socket, comprising a pair of spring-pressed conical members slidable in said support tangentially of said post, said post having a tapered peripheral groove engageable by said conical members with a wedging action thereby to hold said post fixed against movement within the socket of said support.

5. A separable mount for an aircraft gun, adapted for elevational gun adjustment, comprising a support attachable to the aircraft and having a cylindrical socket open at the bottom, a normally fixed member trunnioned to the gun and having a threaded bore, a threaded post having an annular shoulder seated on said support and a lower journal fitting into said socket and adapted for axial withdrawal upwardly therefrom, said post extending into the threaded bore of said member, rotation of said post in the socket effecting elevational gun adjustment, and means for releasably holding said post against rotation and within the socket, comprising a pair of spring-pressed conical members slidable in said support tangentially of said post, the lowest journalled portion of said post presenting a conically grooved portion engageable by said conical members with a wedging action to releasably hold said shoulder firmly pressed down on said support.

6. Apparatus for supporting a firearm entirely enclosed within the restricted volume of a thin aircraft wing, comprising: a base frame attachable to the inside bottom of the wing and having longitudinally-extending, upright, side-members; transverse connecting members spanning said side members; a carriage movably mounted on said connecting members for transverse movement; means for adjusting said carriage's transverse movement; said carriage having a socket, a block trunnioned on the firearm below the lower face thereof and having a threaded bore, and a relatively short, upright, threaded-post journalled at its lower end in the carriage socket and projecting upwardly therefrom in threaded engagement with said block, said post telescoping within said block in the lowermost adjustment of said device to thereby minimize the vertical space existing between the firearm and the bottom of the wing.

7. In a separable gun mount: a transversely adjustable mounting member having a flat seat and a cylindrical socket formed therethrough under said seat, a gun post rotatable to vertically adjust a cooperating gun and having a shoulder normally resting upon said seat, a journal rotatable in said socket and connected to the gun post for unitary rotation therewith and having a tapered groove formed in its periphery and releasable locking means engageable within said groove to press said shoulder down upon said seat and thereby prevent the rotation of said journal and post.

8. The combination with a gun, of a mounting member pivoted thereto having an internally threaded bore, a fixed frame, a carriage carried by the frame for adjustment in the plane thereof having a socket therein, a threaded gun post journaled in said socket and coacting with the threads of the bore of said mounting for the adjustment of the gun, and means for removably and rotatably securing said post in said socket.

9. In a separable gun mount, a member having a socket, a gun post seatable in said socket, and releasable locking means comprising a pair of conical members slidable in said member and disposed tangentially to said post in a plane transverse to its axis, said post having a tapered peripheral portion engageable by said conical members and coacting therewith to apply an axial seating thrust upon the post.

MANUEL S. UNTERMAN.